J. J. PHILLIPS.
WINDING MEANS FOR SPRING MOTORS.
APPLICATION FILED SEPT. 25, 1919.
1,399,790.
Patented Dec. 13, 1921.
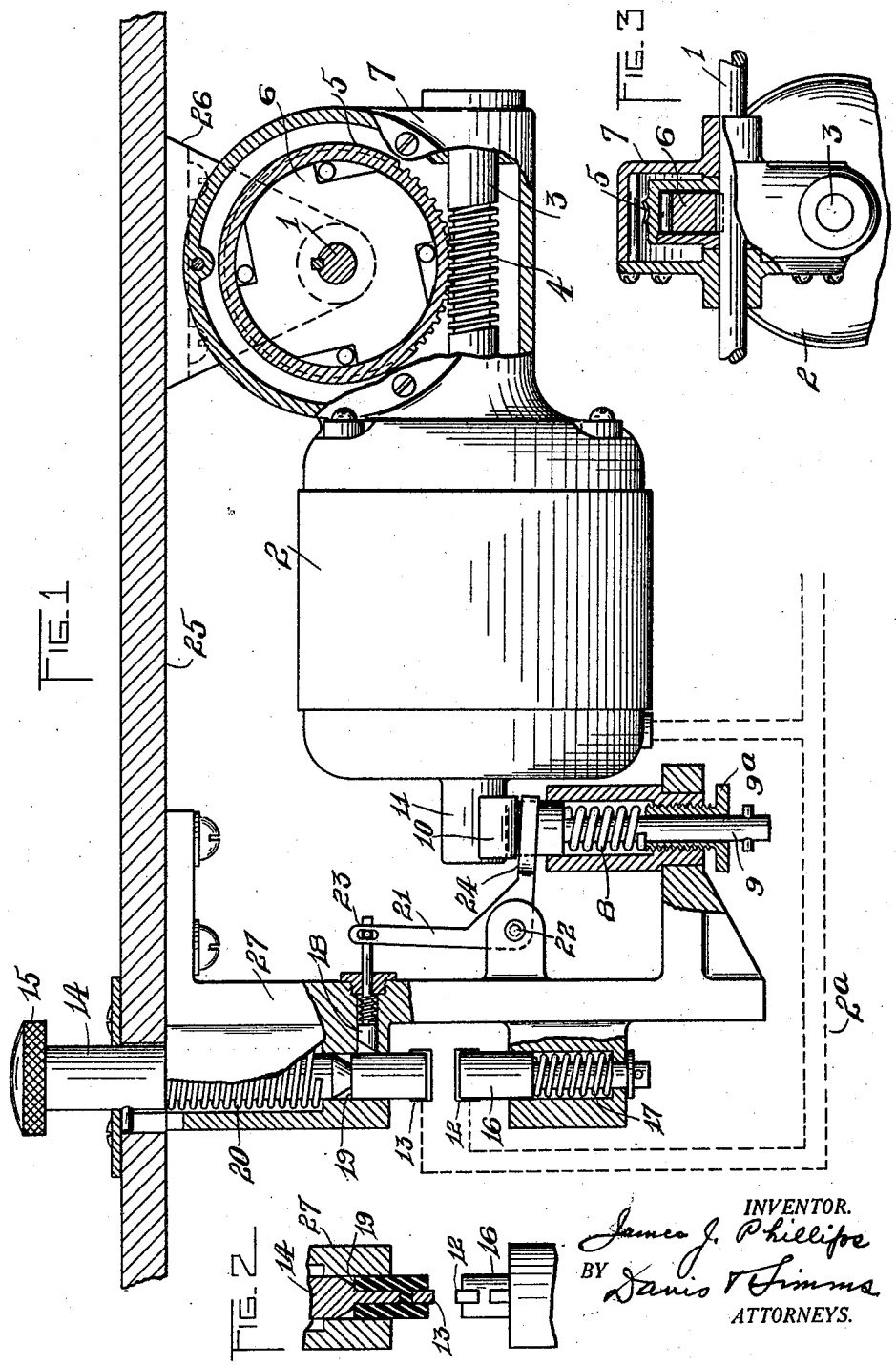
INVENTOR.
James J. Phillips
BY Davis & Simms
ATTORNEYS.

UNITED STATES PATENT OFFICE.

JAMES J. PHILLIPS, OF ROCHESTER, NEW YORK.

WINDING MEANS FOR SPRING-MOTORS.

1,399,790.     Specification of Letters Patent.     Patented Dec. 13, 1921.

Application filed September 25, 1919. Serial No. 326,167.

*To all whom it may concern:*

Be it known that I, JAMES J. PHILLIPS, a citizen of the United States, and resident of Rochester, in the county of Monroe and State of New York, have invented certain new and useful Improvements in Winding Means for Spring-Motors, of which the following is a specification.

The present invention relates to winding mechanisms for spring motors, and an object thereof is to provide an electric motor connected to the shaft of the spring motor and mounted in such a manner that the resistance of the motor when wound up will effect a bodily movement of the electric motor and thus control the switch of the motor in such a manner as to cut out the current fed to the electric motor. Another object of the invention is to provide a controlling switch for the electric motor which is moved manually to a closed position where it is held by a detent until such a time that the spring motor is wound up.

To these and other ends, the invention consists of certain parts and combinations of parts, all of which will be hereinafter described, the novel features being pointed out in the appended claims.

In the drawings:

Figure 1 is a view partially in section showing the mounting of the electric motor, its connection to the spring motor shaft and the controlling means for the electric motor;

Fig. 2 is a detail view of the controller; and

Fig. 3 is a detail view showing the connection between the electric motor and the spring motor shaft.

Referring more particularly to the drawings, 1 indicates the shaft of the spring motor (not shown) and 2 the electric motor. This electric motor preferably has its shaft 3 formed with a worm 4 which meshes with a worm wheel 5 connected to the shaft 1 through a clutch 6 of any suitable construction. To the casing of the motor, a gear casing 7 is rigidly secured, this gear casing being mounted to turn on the shaft 1. This turning action may be normally resisted by a spring 8 which surrounds the plunger 9 having a seat 10 at one end in which the bearing portion 11 of the motor casing 2 rests. During the normal running of the electric motor, the latter transmits motion to the worm gear 5 and through the clutch 6 to the shaft 1, the clutch 6 permitting the spring motor shaft to turn in the opposite direction during the unwinding of the spring motor. When the spring motor is substantially wound, there will be produced a resistance to the turning of the gear 5 by the worm 4 and this resistance is sufficient to cause the electric motor to swing about the shaft 1 as an axis, thus compressing the spring 8.

The swinging movement of the electric motor is utilized for controlling the electric circuit in such a manner as to break such circuit when the spring is wound. In this instance, the controlling means embodies two contacts 12 and 13 which are included in the circuit $2^a$ of the electric motor 2. The contact 13 is mounted on the plunger 14 and has a knob 15 at its upper end through which the contact 13 may be depressed into engagement with the contact 12. The contact 12 preferably is yieldingly mounted and to this end is formed on a plunger 16 whose movement is resisted by a coil spring 17. When the plunger 14 is depressed, a sliding detent 18 enters into engagement with a shoulder 19 on the plunger 14 in order to hold the contacts 12 and 13 in coöperation. The release of the plunger 14 to the action of its spring 20 is effected by the movement of the electric motor. This, in this instance is obtained by a bell crank lever 21 pivoted at 22 and having one arm engaging the detent 18 at 23 and the other arm 24 coöperating with the supporting plunger 9.

The present invention is in this instance, designed for use in talking machines and is herein shown as supported from the table 25 above which the record turns, the spring shaft 1 being suspended from the under side of the table by a bracket 26, while the contacts and operating control of the contacts is supported from the under side of the table by a bracket 27, the plunger 14 being extended through the table so that its operating knob 15 lies above the table.

In the operation of the invention, when it is desired to wind the spring motor, the plunger 14 is depressed until the detent 18 enters into engagement with the abutment 19 and holds the contacts 12 and 13 in coöperation. This coöperation closes the circuit of the electric motor 2 and causes the latter to drive the gear 5 and the spring shaft 1. When the spring has been substantially wound up, the resistance to further turning causes the electric motor casing to swing on the shaft 1 as an axis, thus depressing the plunger 9 and through the bell crank lever operating the detent 18 to release the plunger 14 and break the circuit to the electric motor.

The sleeve 9ᵃ against which the spring 8 rests is employed for adjusting the tension of the spring so that the winding action may be adjusted to stop whenever the main spring has reached the desired tension.

What I claim as my invention and desire to secure by Letters Patent is:

1. In combination with a shaft of a spring motor, a winding mechanism comprising an electric motor having driving connection with the spring motor and mounted to swing about said shaft as an axis, spring means resisting the turning of said motor about the shaft as an axis, a switch for the circuit of the electric motor having a part with a normal tendency to move to a position to break the circuit, and a detent for holding said switch part in a position to make the circuit controlled by the movement of the electric motor about the shaft axis against the action of the spring.

2. In combination with a shaft of a spring motor, a winding mechanism comprising an electric motor having driving connection with the spring motor and mounted to swing about said shaft as an axis, spring means resisting the turning of the spring motor about the shaft as an axis, a switch for the circuit of the electric motor having a part with a normal tendency to move to a position to break the circuit, and means for holding said part against such movement to break the circuit controlled by the movement of the electric motor about the shaft as an axis.

JAMES J. PHILLIPS.